United States Patent [19]

Hasegawa et al.

[11] 4,367,271
[45] Jan. 4, 1983

[54] STORAGE BATTERY SEPARATOR

[75] Inventors: Takao Hasegawa; Wataru Takahashi, both of Gifu, Japan

[73] Assignee: Nihon Mukiseni Kogyo Kabushiki Kaisha, Tokyo, Japan

[21] Appl. No.: 223,691

[22] Filed: Jan. 9, 1981

[30] Foreign Application Priority Data

Jan. 12, 1980 [JP] Japan .................................. 55-1747

[51] Int. Cl.³ ............................................. H01M 2/16
[52] U.S. Cl. .................................... 429/252; 162/146; 264/147; 428/297
[58] Field of Search ............... 429/252, 254, 248, 249, 429/250, 251, 253; 162/146; 264/147; 428/296, 297, 364, 373

[56] References Cited

U.S. PATENT DOCUMENTS 4,216,281  8/1980  O'Rell et al. ......................... 429/252
4,279,979  7/1981  Bensen ................................. 429/254

FOREIGN PATENT DOCUMENTS 51-1093334  8/1976  Japan ................................... 429/254

Primary Examiner—Donald L. Walton
Attorney, Agent, or Firm—Armstrong, Nikaido, Marmelstein & Kubovcik

[57] ABSTRACT

A process for producing a storage battery separator including the mixing of at least 10 parts by weight of glass fiber having at least 1 $m^2/g$ in specific surface area, with a fibril-formed synthetic fiber which is no greater than 350 c.c. in freeness in which the resultant mixture is formed into a sheetlike member suitable for use as a storage battery separator.

4 Claims, No Drawings

STORAGE BATTERY SEPARATOR

BACKGROUND OF THE INVENTION

This invention relates to an improvement in a storage battery separator composed chiefly of a mass of glass fibers and a mass of fibril-formed synthetic fibers mixed therewith. Since glass fiber is rich in hydrophilic property at its surface and can be formed into very fine fiber, the same has been hitherto used for making a sealed-type lead storage battery separator in which the degree of liquid absorption is considered as one of the important characteristics. However, the glass fiber is smooth at its surface and is comparatively stiff, so that a sheet made of the glass fiber alone is inadequate in that the same is low in mechanical strength and does not have good handling properties. Accordingly, there has been hitherto proposed a type of separator in which the glass fiber is mixed with synthetic resin serving as a binding agent, or another type of separator prepared by mixing the glass fiber with synthetic resin monofilament fiber. However, this approach is still inadequate in that the same suffers a remarkable decrease in liquid absorption, and also is defective in that intertwining between the monofilament fiber and the glass fiber is not good and the mechanical strength improving effect is small. If, in addition, the amount of the monofilament fiber is increased, the strength of the separator is improved but the liquid absorption property is lowered.

SUMMARY OF THE INVENTION

This invention has for its object the improvement of those conventional separators and provision of a storage battery separator which is high in liquid absorption property, high in strength, and easy to handle, and is produced by a process using glass fiber which is substantially 1 $m^2/g$ or more in specific surface area mixed with about 10% or less, by weight, of fibril-formed synthetic fiber which is 350 c.c. or less in freeness, and the resultant mixture thereof is formed into a sheet-like member.

DETAILED DESCRIPTION OF THE INVENTION

It has been hitherto known in general that synthetic monofilament fiber, that is, a mass of synthetic monofilament fibers, can be formed into fibril-formed fiber by means of a beater or a refiner. However, a storage battery separator for attaining the foregoing objects cannot be obtained even if glass fiber, that is, a mass of glass fibers, is simply mixed with the synthetic fibril-formed fiber.

A fibril-formed fiber of the synthetic fibril-formed fiber comprises a trunk fiber part having innumerable fine fibers spread therefrom in the form of branches and, therefore, it can be presumed that there is such tendencies that intertwining of the fibril-formed synthetic fiber and the glass fiber become better and more tight through the innumerable branched fine fibers thereof than the conventional case using the synthetic monofilament fiber and that the maximum pore size of fine pores formed between those intertwined fibers becomes smaller, and at the same time there can be obtained innumerable fine pores which are finer in size and are increased in number over the conventional case. However, it has been found as a result of many experimental efforts that, in fact, it is not always possible to obtain better results than in the cases of conventional separators according to change of the value of freeness or an additional amount of fibril-formed fibers.

These experiments were carried out as follows:

A mass of acrylic monofilament fibers by a conventional beater was beated while a beating time and a beating pressure were being changed at every batch, so that there were obtained various kinds of acrylic fibril-formed fibers which are different in various values of freeness ranging from 100 to 600 c.c. at every batch. In regard to every kind of those the fibril-formed acrylic fibers, a mass of the fibril-formed acrylic fibers was mixed with a mass of glass fibers of 2 $m^2/g$ in specific surface area while the addition or mixing amount of the acrylic fibers was changed in the range of 2-20 wt% at every batch, and every resultant mixture thereof was formed by a conventional paper making machine into a separator sheet of 1 mm in thickness and with a grammage of 180 $g/m^2$.

The separators thus produced were tested for liquid absorption amount, tensile strength and other properties. On the other hand, conventional separators were prepared in such a manner that a mass of acrylic monofilament fibers was mixed with a mass of glass fibers of 2 $m^2/g$ in specific surface area while the addition or mixing amount of the acrylic monofilament fibers was changed in the range of 2-20 wt% at every batch, and every resultant mixture thereof was formed by a conventional paper-making machine into a separator sheet of 1 mm in thickness and with a grammage of 180 $g/m^2$. In regard to every conventional separator, comparison tests were carried out. The resultant data of the tests are shown in the following Table 1.

TABLE 1

| | | Acrylic fiber freeness c.c. | Acrylic fiber amount wt % | Glass fiber amount wt % | Liquid absorbing amount c.c./$cm^2$ | Tensile strength g/$mm^2$ | Maximum pore diameter $\mu$ |
|---|---|---|---|---|---|---|---|
| This invention separators | A | 100 | 2 | 98 | 11.5 | 144 | 18 |
| | B | 100 | 5 | 95 | 11.2 | 184 | 15 |
| | C | 100 | 10 | 90 | 10.2 | 230 | 12 |
| | D | 200 | 2 | 98 | 11.5 | 150 | 18 |
| | E | 200 | 5 | 95 | 11.2 | 192 | 16 |
| | F | 200 | 10 | 90 | 10.2 | 246 | 13 |
| | G | 300 | 2 | 98 | 11.5 | 136 | 19 |
| | H | 300 | 5 | 95 | 11.2 | 174 | 17 |
| | I | 300 | 10 | 90 | 10.2 | 220 | 14 |
| | J | 350 | 2 | 98 | 11.5 | 110 | 20 |
| | K | 350 | 5 | 95 | 11.2 | 120 | 19 |
| | L | 350 | 10 | 90 | 11.0 | 150 | 18 |
| | M | 350 | 15 | 85 | 8.5 | 190 | 13 |
| | N | 350 | 20 | 80 | 6.4 | 250 | 11 |
| Control separators | O | 400 | 2 | 98 | 11.5 | 56 | 25 |
| | P | 400 | 5 | 95 | 11.2 | 70 | 24 |
| | Q | 400 | 10 | 90 | 10.2 | 92 | 22 |
| | R | 600 | 2 | 98 | 11.5 | 46 | 27 |
| | S | 600 | 5 | 95 | 11.2 | 54 | 26 |
| | T | 600 | 10 | 90 | 10.2 | 70 | 25 |
| Conventional separators | | 900 | 2 | 98 | 11.5 | 40 | 25 |
| | | 900 | 5 | 95 | 11.2 | 46 | 27 |
| | | 900 | 10 | 90 | 10.2 | 54 | 28 |
| | | 900 | 20 | 80 | 6.4 | 100 | 30 |

The testing used in establishing the values in Table 1 was carried out as follows:

Freeness JISP-8121 using a Canadian Standard type testing device.

Specific Surface area A mercury type porosimeter.

Liquid absorption amount after the separator was measured in its weight and volume, the same was soaked in water and, after taken out, the same was hung for 5 minutes and then the liquid absorption amount thereof was measured.
Tensile strength JIS C2313
Maximum pore size Method of measuring of surface tension of liquid was used and then the pore size was measured from calculation of pressure.

As is apparent from the above Table, even where the fibril-formed synthetic fiber is mixed with the glass fiber the cases where the freeness thereof is 400 c.c. or more, cause the separators to be remarkably lowered in tensile strength as compared with the conventional separators (see Samples O-T), and cases where the addition amount thereof is 15% or more by weight, cause the separators to be remarkably lowered in liquid absorption amount (Samples M. and N.). So that there can be obtained a separator which is improved in tensile strength and at the same time is kept good in liquid absorption property, it is necessary that the freeness is substantially 350 c.c. or below and that the additional amount is about 10% or less by weight.

The maximum hole diameters of separators according to this invention are remarkably smaller in pore size than in conventional separators, so that there is brought about an advantage such that, when the same is used in a battery, the typical short-circuit between electrodes caused by passing of active materials therethrough can be effectively prevented and the use life of the battery can be prolonged.

The conventional synthetic monofilament fiber to be mixed in the coventional separators is a typical one which is 1 denier in size and 5 mm in length, and thus a mass of the conventional monofilament fibers conventionally used is large in freeness, as 850-950 c.c., and thereby there has never been produced any separator which is lower in freeness than that freeness value. Accordingly, the data on the conventional cases shown in the above Table may be considered to be typical of the conventional ones.

As for the glass fiber, that is, a mass of glass fibers, used for the experimental examples shown in the above Table, only the glass fiber of 2 $m^2/g$ its specific surface area was used. However, as a result of many additional experiments, it has been confirmed that a good liquid absorption amount not substantially different from those shown in the above Table can be surely maintained as far as the specific surface area of glass fiber is 1 $m^2/g$ or more (about 2 microns or less in diameter of the fiber), but the absorption amount is clearly lowered and is not preferable if the same is 3 microns or more in diameter and, accordingly, the glass fiber must comprise a mass of fine fibers having substantially 1 $m^2/g$ or more in specific surface area. In general, according to this invention, the separator may be in the range of 0.2 mm-2 mm in thickness and in the range of 30 $g/m^2$-400 $g/m^2$ in grammage.

EXAMPLE 1

A mass of thermoplastic monofilament fibers such as of acrylic monofilament fibers, polyethylene monofilament fibers or the like is beated into a mass of fibril-formed ones by means of a beater to obtain a mass of fibril-formed fibers adjusted to be 200 c.c. in freeness. The mass of fibrilformed fibers of an amount selected from the range of 2-10% by weight is mixed with an amount selected from the range of 90-98% by weight of mass of glass fibers of 2 $m^2/g$ in specific surface area, and the resultant mixture thereof is subjected to a papermaking process to make a separator which is 1 mm in thickness and with a grammage of 180 $g/m^2$.

EXAMPLE 2

The separator made according to Example 1 is passed through a heating furnace of 160°-190° C. to obtain such a separator that the surfaces of the fibril-formed fibers and the surfaces of the glass fibers are melted to be bonded together. The resultant separator was almost the same in liquid absorption property as that in Example 1 and was further higher in tensile strength by about 20% than that.

Thus, according to this invention, a mass of fibril-formed synthetic fibers which is 350 c.c. or less in freeness is mixed, in the ratio of about 10% or less, by weight, with a mass of glass fibers which is substantially 1 $m^2/g$ or more in specific surface area and the resultant mixture is formed into a separator, so that there can be obtained a separator which is remarkably increased in tensile strength and is sufficient in liquid holding property as compared with the conventional separators, and if the same is used as a lead storage battery separator, the life of the battery can be prolonged.

Many modifications and variations of the present invention are possible in light of the above teachings. It is, therefore, to be understood that within the scope of the appended claims, the invention may be practiced otherwise than as particularly described.

What we claim is:
1. A process for producing a storage battery separator comprising:
    mixing about 10 parts by weight of glass fiber which is at least 1 $m^2/g$ in specific surface area with about one part, by weight, of fibril-formed synthetic fiber which is 350 c.c. or less in freeness in which the resultant mixture may be formed into a sheetlike element.
2. A process for producing a storage battery separator comprising:
    mixing between 2 and 10% by weight of a fibril-formed synthetic fiber with between 90 and 98% by weight of a glass fiber having about 2 $m^2/g$ specific surface area, and subjecting the resultant mixture to a paper manufacturing process to thereby form a separator having a thickness of 0.2 mm-2 mm and a grammage of 30 $g/m^2$-400 $g/m^2$.
3. The process for producing a storage battery separator as recited in claim 2, in which, as a yet further step, passing the separator through a heating furnace for melting the surface of the fibril-formed synthetic fiber and for bonding the surface of the glass fiber thereto.
4. A storage battery separator comprising:
    a mixture including at least 10 parts by weight of glass fiber which is at least 1 $m^2/g$ in specific surface area and at least one part by weight of a fibril-formed synthetic fiber, said fiber having a thermoplastic resin monofilament which is beated to become a fibril-formed fiber having an adjusted freeness of between 100-350 c.c.

* * * * *